United States Patent
Tabei

(10) Patent No.: US 7,700,697 B2
(45) Date of Patent: Apr. 20, 2010

(54) CURABLE ORGANOSILICON COMPOSITION AND CURED PRODUCT THEREOF

(75) Inventor: Eiichi Tabei, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 8 days.

(21) Appl. No.: 12/115,821

(22) Filed: May 6, 2008

(65) Prior Publication Data

US 2008/0281056 A1    Nov. 13, 2008

(30) Foreign Application Priority Data

May 7, 2007    (JP)    ............... 2007-122487

(51) Int. Cl.
*C08G 77/00* (2006.01)
*C08G 77/12* (2006.01)

(52) U.S. Cl. ............ 525/477; 525/474; 525/478; 525/479; 528/31; 528/32

(58) Field of Classification Search ........... 525/478; 528/15, 31, 32
See application file for complete search history.

(56) References Cited

U.S. PATENT DOCUMENTS

| | | | |
|---|---|---|---|
| 7,019,100 B2 | 3/2006 | Tabei et al. | |
| 7,176,270 B2 | 2/2007 | Eiichi | |
| 7,291,691 B2 | 11/2007 | Tabei et al. | |
| 7,294,682 B2 | 11/2007 | Goto et al. | |
| 7,323,250 B2 | 1/2008 | Tabei et al. | |
| 2005/0080154 A1* | 4/2005 | Tabei | .............. 522/148 |
| 2005/0213926 A1* | 9/2005 | Tabei et al. | .............. 385/147 |
| 2008/0071023 A1 | 3/2008 | Tabei | |

FOREIGN PATENT DOCUMENTS

JP    2005-15666    1/2005

OTHER PUBLICATIONS

Friedmann, Gilbert; Yamama, Chreim; Brossas, Jean. "Synthesis of Organosilicon Polymers: Silicone and Silicon Carbide Copolymers, Synthesis and Physical Properties." European Polymer Journal. vol. 28, No. 2, pp. 149-151. 1992.*
U.S. Appl. No. 12/115,835, filed May 6, 2008, Tabei.

* cited by examiner

*Primary Examiner*—Randy Gulakowski
*Assistant Examiner*—Kyle Baumstein
(74) *Attorney, Agent, or Firm*—Oblon, Spivak, McClelland, Maier & Neustadt, L.L.P.

(57) ABSTRACT

Provided is a curable organosilicon composition comprising (A) a polycyclic hydrocarbon group-containing organosilicon compound, which comprises two hydrogen atoms bonded to silicon atoms within each molecule, and is an addition reaction product of (a) an organosilicon compound having two hydrogen atoms bonded to silicon atoms within each molecule, and (b) a polycyclic hydrocarbon compound having two hydrosilylation reactive carbon-carbon double bonds within each molecule, (B) a siloxane-based compound having two or more alkenyl groups bonded to silicon atoms within each molecule, and (C) a hydrosilylation reaction catalyst. The curable organosilicon composition yields a cured product that has a high degree of hardness and excellent transparency, crack resistance and heat resistance, and is useful as a curable silicone material, an encapsulating material for optical devices such as optical elements, an encapsulating material for other electronic devices such as semiconductor elements, and an electrically insulating coating material.

17 Claims, No Drawings

CURABLE ORGANOSILICON COMPOSITION AND CURED PRODUCT THEREOF

BACKGROUND OF THE INVENTION

1. Field of the Invention

The present invention relates to a curable organosilicon composition that is useful as a curable silicone material, an encapsulating material for optical devices such as optical elements, an encapsulating material for other electronic devices such as semiconductor elements, and an electrically insulating coating material, and also relates to a cured product of the composition.

2. Description of the Prior Art

In recent years, the output of blue light emitting diodes (LED) and white LEDs has increased, and they are now starting to be used for mobile telephone flashes, backlights for liquid crystal displays, and for general illumination. However, this increase in the LED output has lead to increases in the quantity of ultraviolet light emitted and the quantity of heat generated, meaning the materials used for constructing the devices require better levels of light resistance, heat resistance and crack resistance.

Coating and encapsulating materials for LEDs require favorable transparency, and although conventional epoxy resins exhibit a high degree of hardness and superior crack resistance, they are known to undergo discoloration when exposed to ultraviolet light or heat, which leads to a deterioration in the LED output.

The use of silicone resins has been investigated as one potential solution to the above discoloration problem. Soft silicone resins generally exhibit excellent heat resistance, but they suffer from poor workability and are prone to dirt and dust adhesion. Furthermore, although hard silicones provide excellent workability and handling properties, they tend to suffer from inferior crack resistance.

SUMMARY OF THE INVENTION

The present invention takes the above problems associated with the conventional technology into consideration, and has an object of providing a curable organosilicon composition, which yields a cured product that has a high degree of hardness and excellent transparency, crack resistance and heat resistance, and which is useful as a curable silicone material, an encapsulating material for optical devices such as optical elements, an encapsulating material for other electronic devices such as semiconductor elements, and an electrically insulating coating material. Another object of the present invention is to provide a cured product of this composition.

As a result of intensive investigation aimed at achieving the above objects, the inventors of the present invention were able to complete the present invention. In other words, a first aspect of the present invention provides a curable organosilicon composition, comprising:

(A) a polycyclic hydrocarbon group-containing organosilicon compound, which comprises two hydrogen atoms bonded to silicon atoms within each molecule, and is an addition reaction product of:

(a) an organosilicon compound having two hydrogen atoms bonded to silicon atoms within each molecule, and (b) a polycyclic hydrocarbon compound having two hydrosilylation reactive carbon-carbon double bonds within each molecule, (B) a siloxane-based compound having two or more alkenyl groups bonded to silicon atoms within each molecule, and (C) a hydrosilylation reaction catalyst.

A second aspect of the present invention provides a cured product obtained by curing the above curable organosilicon composition.

A cured product obtained from the curable organosilicon composition of the present invention has a high degree of hardness and excellent transparency, crack resistance and heat resistance. Accordingly, the curable organosilicon composition can be used favorably within applications that involve protecting, encapsulating or bonding light emitting diode elements. Furthermore, the composition can also be used as a lens material, an encapsulating material for optical devices such as optical elements, a variety of optical materials such as display materials, an encapsulating material for other electronic devices such as semiconductor elements, and a coating material such as an electrically insulating coating material.

DETAILED DESCRIPTION OF THE PREFERRED EMBODIMENTS

A more detailed description of the present invention is provided below. In this description, "Me" represents a methyl group, "Vi" represents a vinyl group, and "Ph" represents a phenyl group.

[Component (A)]

The component (A) of the present invention, namely the polycyclic hydrocarbon group-containing organosilicon compound having two hydrogen atoms bonded to silicon atoms (hereafter also referred to as "SiH groups") within each molecule, is an addition reaction product of a component (a) described below, which is an organosilicon compound having two hydrogen atoms bonded to silicon atoms within each molecule, and a component (b) described below, which is a polycyclic hydrocarbon compound having two hydrosilylation reactive carbon-carbon double bonds within each molecule.

<Component (a)>

The component (a) is an organosilicon compound having two hydrogen atoms bonded to silicon atoms within each molecule. There are no particular restrictions on the component (a), provided it undergoes an addition reaction with the component (b) to generate the component (A), although in terms of facilitating improvement in the hardness, transparency, crack resistance and/or heat resistance of the cured product obtained from the composition of the present invention, the component (a) preferably contains a phenylene group, and even more preferably contains a silphenylene group (Si—C$_6$H$_4$—Si). The component (a) may use either a single compound or a combination of two or more different compounds.

In a preferred embodiment of the present invention, an example of the component (a) is an organosilicon compound represented by a general formula (1) shown below.

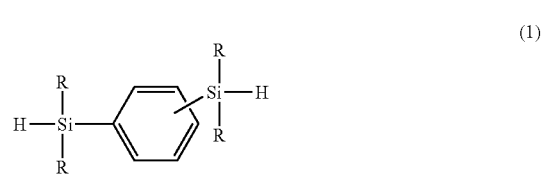

(1)

(wherein, R represents an unsubstituted or substituted monovalent hydrocarbon group of 1 to 12 carbon atoms, and preferably 1 to 6 carbon atoms, and even more preferably 1 to 3 carbon atoms)

Examples of R in the above general formula (1) include alkyl groups of 1 to 12, preferably 1 to 6, and even more preferably 1 to 3 carbon atoms, such as a methyl group, ethyl group, propyl group, isopropyl group, butyl group, tert-butyl group, pentyl group, isopentyl group, hexyl group or sec-hexyl group; cycloalkyl groups of 3 to 12, preferably 4 to 10, and even more preferably 5 or 6 carbon atoms, such as a cyclopentyl group or cyclohexyl group; aryl groups of 6 to 12, preferably 6 to 10, and even more preferably 6 to 8 carbon atoms, such as a phenyl group, or an o-, m- or p-tolyl group; and groups in which a portion of, or all of, the hydrogen atoms within one of the above hydrocarbon groups have been substituted with a halogen atom (for example, a fluorine atom, chlorine atom, bromine atom or iodine atom) or the like, such as a p-fluorophenyl group, p-chlorophenyl group or p-bromophenyl group. In terms of ease of industrial production and availability, organosilicon compounds of the above general formula (1) in which all of the R groups are methyl groups are preferred.

Specific examples of organosilicon compounds represented by the above general formula (1) include the silphenylene compounds 1,4-bis(dimethylsilyl)benzene represented by $HMe_2Si$-p-$C_6H_4$—$SiMe_2H$, 1,3-bis(dimethylsilyl)benzene represented by $HMe_2Si$-m-$C_6H_4$—$SiMe_2H$, and 1,2-bis(dimethylsilyl)benzene represented by $HMe_2Si$-o-$C_6H_4$—$SiMe_2H$.

<Component (b)>

The component (b) is a polycyclic hydrocarbon compound having two hydrosilylation reactive carbon-carbon double bonds within each molecule. The component (b) may be any one of (i) a compound in which the hydrosilylation reactive carbon-carbon double bonds are formed between adjacent carbon atoms that constitute the polycyclic hydrocarbon skeleton, (ii) a compound in which hydrogen atoms bonded to carbon atoms that constitute the polycyclic hydrocarbon skeleton are substituted with groups containing hydrosilylation reactive carbon-carbon double bonds, or (iii) a compound in which a hydrosilylation reactive carbon-carbon double bond is formed between two adjacent carbon atoms that constitute the polycyclic hydrocarbon skeleton, and a hydrogen atom bonded to a carbon atom that constitutes part of the polycyclic hydrocarbon skeleton is substituted with a group containing a hydrosilylation reactive carbon-carbon double bond. The component (b) may use either a single compound or a combination of two or more different compounds.

In a preferred embodiment of the present invention, an example of the component (b) is a polycyclic hydrocarbon compound represented by a general formula (x) shown below.

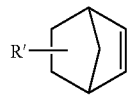

(x)

(wherein, R' represents an unsubstituted or substituted alkenyl group of 2 to 12 carbon atoms).

In the above general formula (x), examples of the alkenyl group represented by R' include groups in which the number of carbon atoms is typically from 2 to 12, preferably from 2 to 6, and even more preferably from 2 to 4. Specific examples include a vinyl group, allyl group, propenyl group, butenyl group, pentenyl group, hexenyl group, and heptenyl group, and of these a vinyl group is preferred.

In a particularly preferred embodiment of the present invention, specific examples of the component (b) include 5-vinylbicyclo[2.2.1]hept-2-ene, represented by a structural formula (y) shown below,

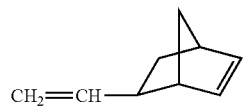

(y)

6-vinylbicyclo[2.2.1]hept-2-ene, represented by a structural formula (z) shown below,

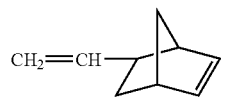

(z)

or a combination of these two compounds (hereafter, in those cases where there is no need to differentiate between these three options, the generic term "vinylnorbornene" may be used).

The arrangement of the vinyl group in the above vinylnorbornenes may adopt either a cis arrangement (the exo form) or a trans arrangement (the endo form), or alternatively, because this variation in the vinyl group arrangement does not cause any significant changes in the reactivity of the component (b), a combination of both isomers may also be used.

<Example of Component (A)>

A specific example of a preferred compound of the component (A) is shown below, although the present invention is not limited to this example.

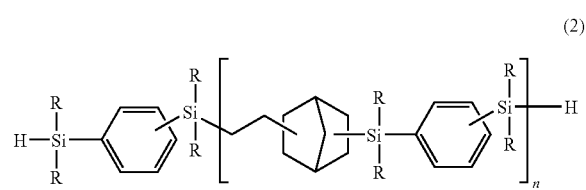

(2)

(wherein, R is as defined above, and n represents an integer from 1 to 50, preferably from 1 to 30, and even more preferably from 1 to 20)

Because this compound includes both a polycyclic hydrocarbon group and a phenylene group, a cured product obtained from this compound has a particularly high degree of hardness, and particularly superior levels of transparency, crack resistance and heat resistance.

<Preparation of the Component (A)>

The polycyclic hydrocarbon group-containing organosilicon compound having SiH groups of the component (A) can be produced by conducting an addition reaction, in the presence of a hydrosilylation reaction catalyst, of an excess of the above component (a) equivalent to more than 1 mol but not more than 10 mols, and preferably more than 1 mol but not more than 5 mols, per 1 mol of the above component (b). Because a molar excess of the component (a) is reacted with the component (b) during the preparation, the resulting polycyclic hydrocarbon group-containing organosilicon compound having SiH groups of the component (A) contains two SiH groups derived from the structure of the component (a) within each molecule.

There are no particular restrictions on the hydrosilylation reaction catalyst, and any of the conventional catalysts may be used. Examples include platinum-based catalysts such as platinic chloride, chloroplatinic acid, reaction products of chloroplatinic acid and monovalent alcohols, complexes of chloroplatinic acid and olefins, platinum bisacetoacetate, metallic platinum supported on carbon powder, and platinum black; as well as other platinum group metal-based catalysts such as palladium-based catalysts and rhodium-based catalysts. Furthermore, there are no particular restrictions on the addition reaction conditions or the solvent used, and normal practices may be followed. The hydrosilylation reaction catalyst may use either a single material or a combination of two or more different materials.

In a specific example, a polycyclic hydrocarbon group-containing organosilicon compound represented by the above general formula (2) can be produced by conducting an addition reaction, in the presence of a hydrosilylation reaction catalyst, of an excess of an organosilicon compound represented by the above general formula (1) equivalent to more than 1 mol but not more than 10 mols, and preferably more than 1 mol but not more than 5 mols, per 1 mol of 5-vinylbicyclo[2.2.1]hept-2-ene, 6-vinylbicyclo[2.2.1]hept-2-ene, or a combination of these two compounds. This reaction may be conducted in the absence of a solvent, or may be conducted in the presence of a solvent such as toluene. The reaction temperature is typically within a range from 50 to 150° C., and is preferably from 80 to 120° C. The reaction time is typically within a range from 10 to 30 hours. The quantity added of the hydrosilylation reaction catalyst need only be sufficient to accelerate the above addition reaction, and a typical quantity, calculated as the mass of the platinum group metal relative to the combined mass of the raw material compounds, is within a range from 1 ppm (on a mass basis, this also applies below) to 1% by mass, and is preferably within a range from 10 to 500 ppm. Provided the quantity of the catalyst is within this range, the addition reaction can be accelerated satisfactorily, and the addition reaction rate can be easily increased by increasing the quantity of the catalyst, which is desirable from an economic perspective.

[Component (B)]

The component (B) is a siloxane-based compound having two or more alkenyl groups bonded to silicon atoms within each molecule, and undergoes an addition to the above component (A) via a hydrosilylation reaction to yield a cured product. There are no particular restrictions on the molecular structure of the component (B), which may be a straight-chain, branched-chain, three dimensional network-type, or cyclic structure. In those cases where the component (B) has molecular chain terminals, the silicon atom-bonded alkenyl groups may be positioned solely at the molecular chain terminals, solely at non-terminal positions within the molecular chain, or at both of these positions. The component (B) may use either a single compound or a combination of two or more different compounds.

Examples of the component (B) include cyclic siloxane-based compounds represented by a general formula (3) shown below, and linear siloxane-based compounds represented by a general formula (4) shown below.

(wherein, each $R^1$ represents, independently, an unsubstituted or substituted monovalent hydrocarbon group of 1 to 12, and preferably 1 to 6, carbon atoms, although of the plurality of $R^1$ groups, at least two must be alkenyl groups, and r represents an integer from 3 to 20, and preferably from 3 to 8)

$$R^3{}_3SiO\text{---}(R^2{}_2SiO)_s\text{---}SiR^3{}_3 \tag{4}$$

(wherein, each $R^2$ and $R^3$ represents, independently, an unsubstituted or substituted monovalent hydrocarbon group of 1 to 12, and preferably 1 to 6, carbon atoms, although of the combined plurality of $R^2$ and $R^3$ groups, at least two groups must be alkenyl groups, and in those cases where at least two of the $R^3$ groups are alkenyl groups, s represents an integer from 0 to 100, and preferably from 1 to 20, whereas in those cases where only one of the $R^3$ groups represents an alkenyl group, or those cases where all of the $R^3$ groups represent monovalent hydrocarbon groups other than alkenyl groups, s represents an integer from 2 to 100, and preferably from 2 to 20).

Examples of the above groups $R^1$ to $R^3$ include alkyl groups such as a methyl group, ethyl group, propyl group, isopropyl group, butyl group, tert-butyl group, pentyl group, hexyl group, heptyl group, octyl group, nonyl group, decyl group, or dodecyl group; cycloalkyl groups such as a cyclopentyl group or cyclohexyl group; aryl groups such as a phenyl group, tolyl group, xylyl group, or naphthyl group; aralkyl groups such as a benzyl group, phenethyl group, or 3-phenylpropyl group; halogenated alkyl groups such as a 3,3,3-trifluoropropyl group or 3-chloropropyl group; and alkenyl groups such as a vinyl group, allyl group, butenyl group, pentenyl group or hexenyl group. Of these, from the viewpoint of industrial availability of the cyclic siloxane-based compound and the linear siloxane-based compound, in those cases where $R^1$ to $R^3$ are alkenyl groups, a vinyl group is preferred, whereas in the case of monovalent hydrocarbon groups other than alkenyl groups, a methyl group is preferred.

Specific examples of preferred compounds of the component (B) are shown below, although the component (B) is not limited to these examples.

$(ViMeSiO)_3$ $(ViMeSiO)_4$ $(ViMeSiO)_3(Me_2SiO)$ $(ViMeSiO)_4(Me_2SiO)$ $Me_3SiO\text{-}(ViMeSiO)_5(Me_2SiO)_5\text{---}SiMe_3$ $ViMe_2SiO\text{-}(Me_2SiO)_5\text{---}SiMe_2Vi$ $ViMe_2SiO\text{-}(Ph_2SiO)_5(Me_2SiO)_5\text{---}SiMe_2Vi$ $ViMe_2SiO\text{-}(ViMeSiO)_5(Me_2SiO)_5\text{---}SiMe_2Vi$ The blend quantity of the component (B) should be sufficient that the number of mols of alkenyl groups such as vinyl groups within the component (B) per 1 mol of SiH groups within the component (A) is preferably within a range from 0.5 to 2.0 mols, and even more preferably from 0.8 to 1.5 mols. Provided the blend quantity is within this range, a cured product with a satisfactory level of hardness for applications such as coating materials can be obtained with relative ease.

[Component (C)]

The hydrosilylation reaction catalyst of the component (C) accelerates the hydrosilylation reaction between the SiH groups within the component (A) and the alkenyl groups bonded to silicon atoms within the component (B). There are no particular restrictions on the hydrosilylation reaction catalyst of the component (C), and any of the conventional catalysts may be used. Examples of the component (C) include platinum-based catalysts such as platinum black, platinic chloride, chloroplatinic acid, reaction products of chloroplatinic acid and monovalent alcohols, complexes of chloroplatinic acid and olefins, and platinum bisacetoacetate; as well as other platinum group metal-based catalysts such as palladium-based catalysts and rhodium-based catalysts. The component (C) may use either a single catalyst, or a combination of two or more different catalysts.

There are no particular restrictions on the blend quantity of the component (C), which need only be an effective catalytic quantity, and a typical quantity, calculated as the mass of the platinum group metal atoms relative to the combined mass of the component (A) and the component (B), is preferably within a range from 1 to 500 ppm, and even more preferably from 2 to 100 ppm. Provided the blend quantity is within this range, the time required for the curing reaction is appropriate, and the resulting cured product is less likely to suffer from problems such as discoloration.

[Other Components]

In addition to the components (A) through (C) described above, the composition of the present invention may also include other optional components, provided the inclusion of such components does not impair the effects of the present invention.

For example, in order to regulate factors such as the viscosity of the composition or the hardness of the cured product, straight-chain diorganopolysiloxanes or network-type organopolysiloxanes containing either alkenyl groups bonded to silicon atoms or SiH groups, and unreactive straight-chain or cyclic diorganopolysiloxanes or silphenylene-based compounds may be added to the composition. Alternatively, an epoxy group-containing reactive siloxane compound may be added to the composition of the present invention to improve the adhesion of the composition to substrates.

In those cases where an organopolysiloxane having SiH groups that is different from the above component (A) but may have any of a variety of structures (hereafter this type of compound is referred to as an organopolysiloxane H) is added to the composition of the present invention, the blend quantity should be set such that relative to 1 mol of the combined total of the SiH groups within this organopolysiloxane H and the SiH groups within the component (A), the quantity of alkenyl groups within the above component (B) preferably falls within a range from 0.5 to 2.0 mols, and even more preferably from 0.8 to 1.5 mols.

In those cases where an organopolysiloxane containing alkenyl groups bonded to silicon atoms that is different from the above component (B) but may have any of a variety of structures (hereafter this type of compound is referred to as an organopolysiloxane A) is added to the composition of the present invention, the blend quantity should be set such that relative to 1 mol of SiH groups within the component (A), the combined total of the alkenyl groups within this organopolysiloxane A and the alkenyl groups within the above component (B) preferably falls within a range from 0.5 to 2.0 mols, and even more preferably from 0.8 to 1.5 mols.

Furthermore, in addition to the components (A) through (C) described above, the composition of the present invention may also include an antioxidant if required. Any of the conventionally available antioxidants may be used, and examples include 2,6-di-t-butyl-4-methylphenol, 2,5-di-t-amylhydroquinone, 2,5-di-t-butylhydroquinone, 4,4'-butylidene-bis(3-methyl-6-t-butylphenol), 2,2'-methylene-bis(4-methyl-6-t-butylphenol), and 2,2'-methylene-bis(4-ethyl-6-t-butylphenol). These compounds may be used either alone or in combinations of two or more different compounds.

In those cases where an antioxidant is added, there are no particular restrictions on the quantity added, and any quantity that provides an effective antioxidant action is adequate, although calculated relative to the combined mass of the component (A) and the component (B), the blend quantity of the antioxidant preferably within a range from 10 to 10,000 ppm, and is preferably from 100 to 1,000 ppm. By ensuring a blend quantity within this range, the antioxidant action manifests satisfactorily, and a cured product with superior optical characteristics, having minimal discoloration, turbidity or oxidative degeneration, can be obtained.

Furthermore, in order to extend the pot life, addition reaction retarders such as 1-ethynylcyclohexanol and 3,5-dimethyl-1-hexyn-3-ol may also be added to the composition of the present invention. In addition, inorganic fillers such as fumed silica may also be added to improve the strength of the composition, provided such addition does not impair the transparency of the cured product produced from the composition, and where necessary, dyes, pigments and flame retardants and the like may also be added to the composition.

Moreover, light stabilizers may also be added to the composition of the present invention in order to impart resistance to light degradation caused by light energy from sunlight or fluorescent lights or the like. Hindered amine-based stabilizers, which capture the radicals generated when a cured product of a composition of the present invention oxidizes and deteriorates on light exposure, are ideal as these light stabilizers, and by using such light stabilizers in combination with the antioxidants described above, the oxidation prevention effect can be further enhanced. Specific examples of these light stabilizers include bis(2,2,6,6-tetramethyl-4-piperidyl)sebacate and 4-benzoyl-2,2,6,6-tetramethylpiperidine.

[Preparation of the Composition]

The curable organosilicon composition of the present invention can be prepared by mixing the components (A) through (C), and where necessary, any other optional components.

[Production of Cured Product]

Curing the curable organosilicon composition of the present invention yields a cured product that has a high degree of hardness and excellent transparency, crack resistance and heat resistance. There are no particular restrictions on the curing conditions, which vary depending on the quantity of the composition, but the curing temperature is preferably within a range from 60 to 180° C., and the curing time is typically within a range from 1 to 10 hours.

[Applications]

The curable organosilicon composition of the present invention is useful as a curable silicone material, an encapsulating material for optical devices such as optical elements, an encapsulating material for other electronic devices such as semiconductor elements, and an electrically insulating coating material. Examples of optical devices include optical elements such as LEDs, semiconductor lasers, photodiodes, phototransistors, solar cells and CCDs; and optical components such as lenses. Examples of electronic devices include semiconductor elements such as diodes, transistors, ICs, CPUs and memory elements.

EXAMPLES

Specifics of the present invention are described below using a series of examples and comparative examples, although the present invention is in no way limited by the examples presented below.

Synthesis Example 1

Preparation of Component (A)

A 500 ml four-neck flask fitted with a stirrer, a cooling tube, a dropping funnel and a thermometer was charged with 194 g (1 mol) of 1,4-bis(dimethylsilyl)benzene and 100 g of toluene as a solvent, and the flask was then heated to 85° C. using an oil bath. 0.1 g of a carbon powder supporting 5% by mass of platinum metal was added to the flask, and with the mixture undergoing constant stirring, 60 g (0.5 mols) of a vinylnorbornene (product name: V0062, manufactured by Tokyo Kasei Kogyo Co., Ltd., a substantially equimolar isomeric mixture of 5-vinylbicyclo[2.2.1]hept-2-ene and 6-vinylbicyclo[2.2.1]hept-2-ene) was added dropwise over a period of 60 minutes. Following completion of the dropwise addition, the reaction mixture was stirred for a further 24 hours under heating at 120° C., and was then cooled to room temperature. Subsequently, the carbon powder-supported platinum metal was removed by filtration, and the toluene and unreacted raw materials were removed by evaporation under reduced pressure, yielding 206 g of a colorless and transparent oily reaction product (viscosity at 25° C.: 300 Pa·s).

The results of FT-IR, NMR and GPC analyses of the reaction product confirmed that the product was a mixture represented by the structural formula shown below (n=1: 38 mol %, n=2: 20 mol %, n=3: 16 mol %, n=4 to 10: a total of 26 mol %). Furthermore, the refractive index of the reaction product was 1.545.

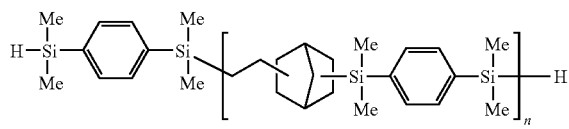

Example 1

A composition was prepared by mixing uniformly together:

(A) 77 parts by mass of the reaction product obtained in the synthesis example 1, (B) 15 parts by mass of (ViMeSiO)$_4$, (C) a platinum-vinylsiloxane complex as a curing catalyst, in sufficient quantity to provide 20 ppm of platinum metal atoms relative to the total mass of the composition, (D) 0.03 parts by mass of 1-ethynylcyclohexanol, and (as another component) 8 parts by mass of 1-(2-trimethoxysilylethyl)-3-(3-glycidoxypropyl)-1,3,5,7-tetramethylcyclotetrasiloxane.

This composition was poured into a mold formed from glass plates to generate a thickness of 2 mm, and was then heated at 150° C. for 5 hours, thus yielding a cured product.

Example 2

A composition was prepared by mixing uniformly together:

(A) 75 parts by mass of the reaction product obtained in the synthesis example 1, (B) 17 parts by mass of (ViMeSiO)$_4$, (C) a platinum-vinylsiloxane complex as a curing catalyst, in sufficient quantity to provide 20 ppm of platinum metal atoms relative to the total mass of the composition, (D) 0.03 parts by mass of 1-ethynylcyclohexanol, and (as another component) 8 parts by mass of 1-(2-trimethoxysilylethyl)-3-(3-glycidoxypropyl)-1,3,5,7-tetramethylcyclotetrasiloxane.

This composition was poured into a mold formed from glass plates to generate a thickness of 2 mm, and was then heated at 150° C. for 5 hours, thus yielding a cured product.

Example 3

A composition was prepared by mixing uniformly together:

(A) 73 parts by mass of the reaction product obtained in the synthesis example 1, (B) 19 parts by mass of (ViMeSiO)$_4$, (C) a platinum-vinylsiloxane complex as a curing catalyst, in sufficient quantity to provide 20 ppm of platinum metal atoms relative to the total mass of the composition, (D) 0.03 parts by mass of 1-ethynylcyclohexanol, and (as another component) 8 parts by mass of 1-(2-trimethoxysilylethyl)-3-(3-glycidoxypropyl)-1,3,5,7-tetramethylcyclotetrasiloxane.

This composition was poured into a mold formed from glass plates to generate a thickness of 2 mm, and was then heated at 150° C. for 5 hours, thus yielding a cured product.

Comparative Example 1

With the exceptions of using 60 parts by mass of (MeHSiO)$_4$ instead of the 77 parts by mass of the component (A), altering the quantity of the (ViMeSiO)$_4$ of the component (B) from 17 parts by mass to 40 parts by mass, and not adding the (other component), a composition and a cured product were produced in the same manner as the example 1.

Comparative Example 2

With the exception of replacing the composition obtained in the example 1 with a phenylsilicone resin-based curable composition (product name: X-34-1195, manufactured by Shin-Etsu Chemical Co., Ltd., phenyl group content: approximately 50 mol %), a cured product was produced in the same manner as the example 1.

[Performance Evaluation Methods]

The performance of the cured products obtained in each of the above examples and comparative examples was evaluated using the following techniques.

<External Appearance>

The external appearance of each cured product was inspected visually. The results are shown in Table 1.

<Hardness>

The hardness (Shore D) of each cured product was measured in accordance with ASTM D 2240. The results of the measurements are shown in Table 1.

<Crack Resistance>

Each of the resin compositions obtained in the examples and comparative examples was poured into a PPA cup comprising an LED chip that had been wire bonded with gold wire, and was subsequently cured by heating at 100° C. for 1 hour and then at 150° C. for a further 5 hours. Using a thermal shock tester, the resulting structure was subjected to 100 cycles of a thermal shock test, with each cycle comprising 30 minutes at −40° C. and then 30 minutes at 100° C., and the structure was then inspected for cracking. The results are shown in Table 1, using the evaluation criteria shown below.

A: No anomalies
B: Micro-cracks around the wiring portion
C: Cracking around the wiring portion and the chip portion
D: Cracks exist throughout the entire encapsulating resin, or the resin may suffer detachment <Heat Resistance>

The light transmittance at 400 nm of the 2 mm thick cured product prepared in each of the examples and comparative examples was measured, the cured product was then left to stand for 240 hours at 150° C., and the light transmittance at 400 nm was then re-measured. The measurement results are shown in Table 1.

TABLE 1

| Item | Example | | | Comparative example | |
|---|---|---|---|---|---|
| | 1 | 2 | 3 | 1 | 2 |
| External appearance | colorless, transparent | colorless, transparent | colorless, transparent | colorless, transparent | colorless, transparent |
| Hardness (Shore D) | 70 | 71 | 75 | 0 | 64 |
| Crack resistance | A | A | A | D | D |
| Initial transmittance (%) | 88.3 | 88.7 | 88.4 | 90.5 | 88.1 |
| Transmittance after 240 hours at 150° C. (%) | 85.2 | 84.1 | 84.5 | 84.7 | 85.1 |

[Evaluation]

The cured products of the examples were colorless and transparent, exhibited a high degree of hardness, and also offered superior crack resistance and light transmittance. Furthermore, the cured products also exhibited levels of resistance to heat and coloration that were similar to conventional coating materials, meaning they are suitable for use as all manner of optical materials and encapsulating materials.

What is claimed is:

1. A curable organosilicon composition, comprising:
   (A) at least one polycyclic hydrocarbon group-containing organosilicon compound, which comprises two hydrogen atoms bonded to silicon atoms within each molecule, and is an addition reaction product of:
      (a) at least one organosilicon compound represented by a general formula (1):

$$\text{(1)}$$

wherein each R group represents an unsubstituted or substituted monovalent hydrocarbon group of 1 to 12 carbon atoms and
      (b) at least one polycyclic hydrocarbon compound having two hydrosilylation reactive carbon-carbon double bonds within each molecule,
   (B) at least one siloxane-based compound having two or more alkenyl groups bonded to silicon atoms within each molecule, and
   (C) at least one hydrosilylation reaction catalyst.

2. The curable organosilicon composition according to claim 1, wherein the component (b) is a polycyclic hydrocarbon compound represented by a general formula (x) shown below:

$$\text{(x)}$$

wherein, R' represents an unsubstituted or substituted alkenyl group of 2 to 12 carbon atoms.

3. The curable organosilicon composition according to claim 1, wherein the component (b) is 5-vinylbicyclo[2.2.1]hept-2-ene, 6-vinylbicyclo[2.2.1]hept-2-ene, or a combination thereof.

4. The curable organosilicon composition according to claim 1, wherein the component (A) is a polycyclic hydrocarbon group-containing organosilicon compound represented by a general formula (2):

$$\text{(2)}$$

wherein, each R is as defined above, and n represents an integer from 1 to 50.

5. A cured product obtained by curing the curable organosilicon composition defined in claim 1.

6. The cured product according to claim 5, exhibiting an initial transmittance of at least 88.3%.

7. The cured product according to claim 5, exhibiting a transmittance after 240 hours at 150° C. of at least 84.1%.

8. The compound according to claim 1, wherein component (a) is at least one member selected from the group consisting of 1,4-bis(dimethylsilyl)benzene represented by HMe$_2$Si-p-C$_6$H$_4$—SiMe$_2$H, 1,3-bis(dimethylsilyl)benzene represented by HMe$_2$Si-m-C$_6$H$_4$—SiMe$_2$H, and 1,2-bis(dimethylsilyl)benzene represented by HMe$_2$Si-o-C$_6$H$_4$—SiMe$_2$H.

9. The compound according to claim 2, wherein R' of component (b) is at least one member selected from the group consisting of a vinyl group, an allyl group, a propenyl group, a butenyl group, a pentenyl group, a hexenyl group, and a heptenyl group.

10. The compound according to claim 2, wherein component (b) is at least one member selected from the group consisting of 5-vinylbicyclo[2.2.1]hept-2-ene and 6-vinylbicyclo[2.2.1]hept-2-ene.

11. The compound according to claim 1, wherein component (B) is at least one cyclic compound represented by formula (3):

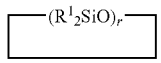  (3)

wherein each R$^1$ group represents, independently, an unsubstituted or substituted monovalent hydrocarbon group of 1 to 12 provided that at least two R$^1$ groups are alkenyl groups, and r represents an integer from 3 to 20.

12. The compound according to claim 1, wherein component (B) is at least one linear compound represented by formula (4):

$$R^3{}_3SiO—(R^2{}_2SiO)_s—SiR^3{}_3 \quad (4)$$

wherein,
each R$^2$ and R$^3$ represents, independently, an unsubstituted or substituted monovalent hydrocarbon group of 1 to 12, provided that at least two of the R$^2$ and R$^3$ groups must be alkenyl groups;

s represents an integer from 0 to 100 when at least two of the R$^3$ groups are alkenyl groups; and s represents an integer from 2 to 100 when only one of the R$^3$ groups represents an alkenyl group, or when all of the R$^3$ groups represent monovalent hydrocarbon groups other than alkenyl groups.

13. The compound according to claim 1, wherein component (B) is at least one compound selected from the group consisting of (ViMeSiO)$_3$, (ViMeSiO)$_4$, (ViMeSiO)$_3$(Me$_2$SiO), (ViMeSiO)$_4$(Me$_2$SiO), Me$_3$SiO-(ViMeSiO)$_5$(Me$_2$SiO)$_5$—SiMe$_3$, ViMe$_2$SiO-(Me$_2$SiO)$_5$—SiMe$_2$Vi, ViMe$_2$SiO-(Ph$_2$SiO)$_5$(Me$_2$SiO)$_5$—SiMe$_2$Vi, and ViMe$_2$SiO-(ViMeSiO)$_5$(Me$_2$SiO)$_5$—SiMe$_2$Vi.

14. The compound according to claim 1, wherein the at least one hydrosilylation reaction catalyst is selected from the group consisting of platinum black, platinic chloride, chloroplatinic acid, a reaction product of chloroplatinic acid and a monovalent alcohol, a complex of chloroplatinic acid and an olefin, platinum bisacetoacetate, a palladium catalyst, and a rhodium catalyst.

15. The compound according to claim 1, wherein the at least one hydrosilylation reaction catalyst is present in an amount of from 1 to 500 ppm, relative to the combined mass of components (A) and (B).

16. The compound according to claim 1, further comprising at least one antioxidant selected from the group consisting of 2,6-di-t-butyl-4-methylphenol, 2,5-di-t-amylhydroquinone, 2,5-di-t-butylhydroquinone, 4,4'-butylidene-bis(3-methyl-6-t-butylphenol), 2,2'-methylene-bis(4-methyl-6-t-butylphenol), and 2,2'-methylene-bis(4-ethyl-6-t-butylphenol).

17. The compound according to claim 16, wherein at least one antioxidant is present in an amount of from 10 to 10,000 ppm relative to the combined mass of components (A) and (B).

* * * * *